United States Patent [19]
Hora

[11] Patent Number: 4,719,482
[45] Date of Patent: Jan. 12, 1988

[54] THREE-DIMENSIONAL COLOR TELEVISION

[76] Inventor: Heinrich W. Hora, 553 VanAllen Hall, Iowa City, Iowa 52242

[21] Appl. No.: 860,793

[22] Filed: May 8, 1986

[51] Int. Cl.$^4$ .......................................... H04N 13/00
[52] U.S. Cl. ..................... 350/91; 358/901; 358/3; 358/92
[58] Field of Search .................. 358/3, 88, 89, 91, 92, 358/232, 901; 350/130–143, 347 R

[56] References Cited

U.S. PATENT DOCUMENTS

| | | | |
|---|---|---|---|
| 2,118,160 | 5/1938 | Cawley | 358/232 X |
| 2,777,011 | 1/1957 | Marks | 358/3 X |
| 2,983,835 | 5/1961 | Frey, Jr. | 358/901 X |
| 3,150,356 | 9/1964 | Newman | 358/901 X |
| 3,858,001 | 12/1974 | Bonne | 358/92 |
| 4,023,158 | 5/1977 | Corcoran | 358/88 X |
| 4,571,616 | 2/1986 | Haisma et al. | 358/901 X |

*Primary Examiner*—James J. Groody
*Assistant Examiner*—Victor R. Kastak
*Attorney, Agent, or Firm*—Chernoff, Vilhauer, McClung & Stenzel

[57] ABSTRACT

An apparatus and a method for three-dimensional (3D) color televisions where the two simultaneously recorded static or movie pictures of a scene from two different directions are merged into one picture of a TV-receiver is disclosed. The pickups from two different directions are reproduced in different orientations of linear polarization of light such that when viewing through glasses with different polarization, each eye will receive the picture of each recording separately which will be perceived as a 3-D image. The different orientations of linear polarization are produced by subjecting the images from a first direction to an electric field which causes the light to become plane polarized according to the Kerr effect, while the electric field is switched off for the images from the second direction. Polarization is thus provided on alternate frames as light passes through a fiber optic medium which includes thin, transparent electrodes which are switched on and off in synchronization with the frame repetition rate.

3 Claims, 2 Drawing Figures

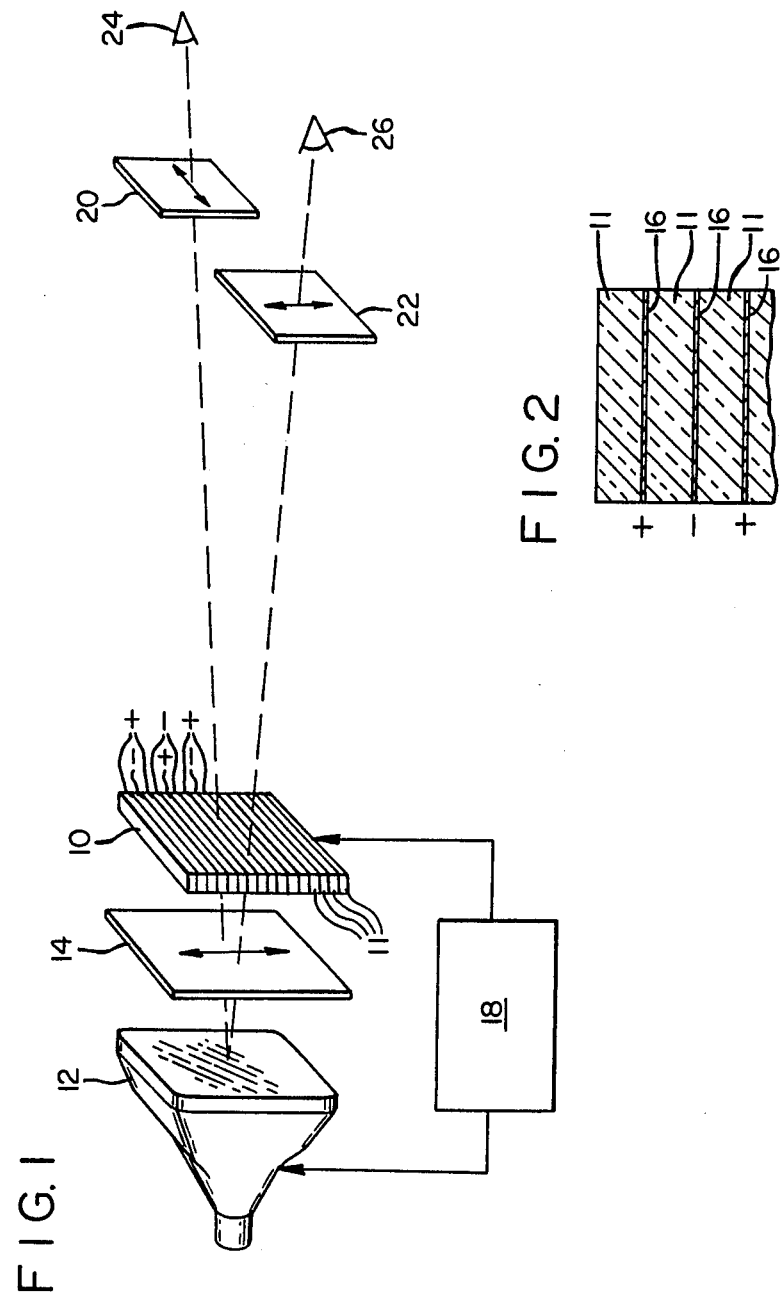

THREE-DIMENSIONAL COLOR TELEVISION

BACKGROUND OF THE INVENTION

There are many methods for reproducing stereo-pictures (three dimensional pictures) such that the observer has the full spatial impressions of the object. This is done, e.g., by arranging the two pictures recorded from two different directions, as the two eyes of an observer view from the corresponding directions, on a screen and viewing the pictures through glasses of different color for non-color reproduction. If a color image is required, the different pictures are illuminated with linear polarized light of perpendicular orientation and glasses are used with the appropriate polarization such that the eyes see the objects separately in stereo. One difficulty with the foregoing is that the eyes are focused in an unnatural way, i.e. looking in different directions on alternate frames, if the reproduced pictures have to be next to each other.

The ideal method requires that the two reproduced pictures of different polarization be located within the same frame. This can be realized, e.g., by holographic production of the color TV picture. This method, however, is basically limited by the coherence length of the radiation such that the stereo effects can be seen only within a certain depth, e.g., 30 centimeters to 1 meter with the current generation of holographic reproduction equipment. This depth, even if extended, is limited by basic principles of physics. A further difficulty is that the granulation of the transmitted picture requires extremely high resolution and very small grain photographic material must be used. The electronic transmission of such pictures also requires an extraordinarily large bandwidth and minimal signal distortion.

SUMMARY OF THE INVENTION

The present invention provides a three dimensional television display comprising a video source for providing sequential video images which are photographed from first and second locations, respectively, in an alternating sequence, a plane polarizing screen for plane polarizing the light from the video source, and an electro-optical polarization rotating device for selectively rotating the polar orientation of the light from the video source on alternate frames of video such that the images photographed from a first location reach the viewer with a first polarization and the images photographed from the second location reach the viewer with a second polarization.

The electro-optical polarization rotating device may comprise a fiber optic transmission medium interleaved with thin electrode layers that are alternatively switched on and off on successive frames of video.

A principal object of this invention is to provide a three dimensional television display without the need for moving mechanical parts and utilizing the electro-optical properties of a fiber optic medium to rotate the polarization of a plane polarized video image on alternate frames of video.

The foregoing and other objectives, features, and advantages of the invention will be more readily understood upon consideration of the following detailed description of the invention, taken in conjunction with the accompanying drawings.

DESCRIPTION OF THE DRAWINGS

FIG. 1 is a perspective view of the 3-D television system of the present invention.

FIG. 2 is a fragmentary sectional view of the electro-optical device of FIG. 1.

Description of the Invention

In order to avoid the mentioned difficulties of existing methods for stereo color televisions, for producing pictures within the same frame for the two different observation directions of the eyes, without the limits of the depth of the stereo mechanism and without a too strong increase of the necessary electronic transmission capacity, the invention uses, as shown in FIG. 1, an electro-optical device 10. The color picture will be produced in the plane "picture" by a video source 12 in a conventional or in an especially developed way as will further be described. The pictures are—if not static—produced in a temporal sequence having twice the normal frame repetition rate. If the usual rate is 16 pictures per second as an example, the invention uses 32 pictures per second where all even numbers of pictures come from a pick-up camera viewing a scene from one direction (not shown) and the odd numbers of pictures are from a second camera viewing the scene from a second direction (not shown). Light in the picture plane passes through a colorless polarization filter 14 such that only (or to a degree of more than 90%) linearly polarized light is transmitted, e.g. in the vertical direction of polarization. From there the light goes through an electro-optical device 10 consisting of fiber optical or similar optical transmitters 11 such that the picture entering at the side of the polarization filter is reproduced on the other side where the picture is being viewed. The material of the fibers chosen has a sufficiently strong electro-optical Kerr-effect or a Pockels-effect, such that an electric field applied perpendicularly to the direction of light propagation (or in another preferential direction) will turn the direction of the vertical polarization into horizontal polarization when reaching the other end of the fibers.

The electric fields are produced by arranging thin electrically conducting but preferably optically transparent layers 16 (E-Layers) in a horizontal orientation between the fibers with sufficient electrical insulation between the E-layers such that potentials in alternating sequence (+, −, +, − etc.) can be applied. If the distances between the E-layers 16 are small enough, only moderate electrical potentials have to be applied in order to produce the 90° rotation of the polarization direction as mentioned before.

The operation of the device is then synchronized with the application of electrical potentials by a synchronizing circuit 18 such that the polarization is vertical for the even numbered pictures and horizontal for the odd numbered pictures produced by the video source. As the pictures are usually produced by a scanning method, the switching of the potentials may also be done in synchronization with the scanning for improvement of the pictures. Looking then with glasses viewing the other end of the electro-optical device which include colorless polarizers 20 and 22, e.g. in the horizontal direction for the one eye 24 and in the vertical direction for the other eye 26, one will see a color TV in full three dimensions with no limitation to the depth by coherence effects.

The requirements of optical resolution of the pictures may need to be increased above the present numbers of several hundred lines per picture in TV pictures which in the next generation of electronics could well be met with the capacity of fiberoptics transmission where frequencies 100 GHz will be standard routines. Electric capacity is increased also by a factor of two because of the two different directions of observations needed for the transmission.

The pictures may be produced in conventional or in further developed ways. One slight modification for color-TV production of pictures is that instead of the standard hole plate in the glass tubes of TV sets, line plates may be used in order that the three electron beams of the tube are hitting the red, green and blue phosphors separately by reasons of different angles of incidence behind the openings of the plate. This scheme is known with horizontal line plates instead of the hole plates. In this case however, the horizontal arrangement will have to be used when there is line scanning. In order to provide higher resolution of transmitted information, the scanning per line is then not necessarily resolved into single points within the line but a continuous variation of the scanning beams is preferable. For this analog-type scanning, a high quality transmission of the information through the air or metallic or optical cables will then be performed with Fourier-transformed and re-transformed electronic signals.

In order to achieve a higher resolution, apart from increasing the number of the lines, the omission of the hole or line plates in the electron beam receiver tubes is possible by operating the viewing system in a manner similar to black-and-white TV-tubes. This is achieved by using one electron beam only wherein color is produced by quantum modulation of the electron beam either by using lasers (U.S. Pat. No. 3,730,979) or plasmons in a solid slab with spatial varying electron densities according to the spectrum of the colors for the optical wavelength between pink and red (German Pat. No. 2,111,852).

The stereo color TV with the electro-optical plate according to the present invention can be realized also with the production of the picture by irradiating scanning optical beams from lasers instead of the production of the picture in an electron beam tube. The same is applicable if the picture is produced by the methods of electrostatic motion of thin oil films as developed for large scale production of pictures.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed as new and desired to be secured by Letters Patent of the United States is:

1. A three dimensional television display comprising:
    (a) a video source for producing frames of video wherein a first series of frames represent pictures taken from a first location and a second series of frames represent pictures taken from a second location, wherein said first and second series of frames of video are produced by said video source one at a time in alternating sequence at a relatively high frame repetition rate that is substantially greater than the normal frame repetition rate for a conventional video source;
    (b) plane polarizing screen means for plane polarizing the light from each frame of video produced by said video source;
    (c) electro-optical means for selectively rotating the plane of polarization of said light passing through said plane polarizing screen means by 90°, said electro-optical means comprising a plurality of layers of optical fiber material having a sufficiently strong optical effect that an electric field applied perpendicularly to the direction of light propagation produces a Kerr effect thereby rotating said plane of polarization and including transparent electrode means comprising thin layers of electrically conductive material interleaved between said layers of optical fiber material and having predetermined polarities of alternating sequence for selectively providing said electric field; and
    (d) synchronizing means for supplying electrical potential to said electrodes on alternate frames of video such that said Kerr effect is created in said electro-optical means when video frames from said first series of frames are produced by said video source, and for turning off said electrical field when video frames from said second series of frames are produced by said video source.

2. The three-dimensional television of claim 1 wherein said plane polarizing screen produces vertical polarization of light from said video source.

3. The three dimensional television of claim 2 wherein said layers of optical fiber material are relatively thin to permit the use of low electrical potentials on said thin layers of electrically conducting material.

* * * * *